United States Patent [19]

Hill et al.

[11] 4,094,013

[45] June 6, 1978

[54] OPTICAL STORAGE DISK SYSTEM WITH DISK TRACK GUIDE SECTORS

[75] Inventors: Bernhard Hill, Hamburg; Rudiger Pepperl, Pinneberg; Johann Krüger, Quickborn, all of Germany

[73] Assignee: U.S. Philips Corporation, New York, N.Y.

[21] Appl. No.: 686,254

[22] Filed: May 13, 1976

[30] Foreign Application Priority Data

May 22, 1975 Germany ............................... 2522593
Mar. 3, 1976 Germany ............................... 2608715

[51] Int. Cl.$^2$ ..................... G11B 7/00; G11B 21/10; G11C 13/08
[52] U.S. Cl. ..................... 365/234; 358/128; 360/77; 365/215
[58] Field of Search .............. 360/48, 49, 50, 77, 360/78, 114; 340/173 LM, 173 LT; 358/128

[56] References Cited

U.S. PATENT DOCUMENTS

| | | | |
|---|---|---|---|
| 3,408,656 | 9/1968 | Lamberts | 340/173 LM |
| 3,573,471 | 4/1971 | Kolb | 340/173 LM X |
| 3,919,697 | 11/1975 | Walker | 340/173 LM X |
| 3,962,688 | 6/1976 | Westerberg | 340/173 LT X |
| 3,971,002 | 7/1976 | Bricot et al. | 340/173 LM X |
| 3,994,016 | 11/1976 | Moghadam | 360/78 X |
| 3,996,570 | 12/1976 | Roberts | 340/173 LM |

*Primary Examiner*—Bernard Konick
*Assistant Examiner*—Donald McElheny
*Attorney, Agent, or Firm*—Frank R. Trifari; Simon L. Cohen

[57] ABSTRACT

A storage disk comprising at least one data track which is composed of spiral-shaped turns or concentrical turns, the data being arranged in the form of data blocks on the turns so that between the data blocks alternately a guide segment or a blank segment is present. The lengths of the unit, measured in angular degrees, consisting of data block and guide segment and the unit consisting of data block and blank segment are substantially the same and are chosen so that the same number of units is accommodated in each turn. The spirals are sub-divided into sectors which contain only data blocks or only guide segments or blank segments. In each sector containing guide segments the radial distance between these segments is substantially twice the distance between the data blocks in each sector containing data blocks. The invention also relates to a device for writing and/or reading data of a rotating disk as described, comprising a light deflection system which notably includes a slow light deflector and a fast light deflector, the latter deflector scanning the guide segments.

21 Claims, 14 Drawing Figures

OPTICAL STORAGE DISK SYSTEM WITH DISK TRACK GUIDE SECTORS

The invention relates to a storage disk comprising at least one information track in the form of spiral-shaped turns or of concentric tracks and also relates to an arrangement for writing and/or reading the data.

Digital storage systems are known which utilize the high storage density which can be achieved by optical methods; for example, U.S. Pat. No. 3,624,284 discloses a recording playback system, including an optical scanner, for the photographic recording of digital data. The scanner of this system deflects a light beam in two dimensions, so that the data are recorded on a stationary disk in the form of a spiral. This method, however, has the following drawbacks: the high storage densities which can in principle be obtained by optical recording cannot be achieved, because the light beam is guided along the data spiral during the data retrieval in a manner such that the scanner alternately scans the right half and the left half of the data track, so that a given unused space must be present between the data tracks. Furthermore, this method does not offer random access to the data stored, because the scanner must start to follow the spiral containing the data from the outer edge.

Also known are storage systems where the data are stored on a rotating disk by optical means, for example, the "VLP" system described in Philips Technical Review 33, 1973, No. 7, pages 178–180. The known system, however, has given drawbacks, notably as regards the storage capacity for digital data storage.

The objective which focusses the light beam onto the storage layer during data retrieval must be guided across the disk in the radial direction by a mechanical system. Furthermore, the data spirals or the concentric tracks must have a well-defined structure, perpendicular to the radial direction, so that a control signal for controlling the objective in the radial direction can be derived therefrom. Therefore, according to the "VLP" system the data are stored in analog form in elongate strips of variable length on the storage disk. The quality of the signal recovered during the playback is limited due to this analog method. Furthermore, for guiding the read system on the data track, the light beam is split into three sub-beams, one of which is centered on the data track while the other two sub-beams scan the right and left edges of the data track. This means that sufficient space must be left between the data tracks, so that the storage density is limited. Moreover, a position-sensitive detector system or a plurality of detectors are required for measuring the position of the beam with respect to the data track.

The invention has for its object to eliminate the drawbacks of the known storage disk and its system and to improve the control and guiding of the light beam while offering a higher storage density.

This object is achieved in that the data are arranged on the turns of the storage disk in the form of data blocks, so that between the data blocks alternately a guide segment or a blank segment is present, the lengths measured in angle degrees, of the unit consisting of data block and guide segment and the unit consisting of data block amd blank segment being substantially equal and being chosen so that each turn accommodates the same number of units, the turns being sub-divided into sectors which contain only data blocks or only guide segments or blank segments, in each sector containing guide segments the radial distance between these segments being substantially twice the distance between the data blocks in each sector containing data blocks.

The data track need not have a special structure, because use is made of only one light beam whereby the writing as well as the reading of data and the control of the guiding along the data track is performed.

The storage disk according to the invention is preferably suitable for use as a digital record carrier.

The first turn of the spiral track or the first concentric track of the said storage disk in accordance with the invention preferably consists only of guide segments. It is thus ensured that the leading-in of a deflection system during the writing and/or reading of the disk can be accurately effected. Because there is an alternation of guide segments and blank segments, viewed in the radial direction, the track width of the guide segments is preferably larger than that of the data track. The readjustment of the positioning on the guide track is thus facilitated. The guide segments can be coded in accordance with a further aspect of the invention; the said code indicates that an even or an odd turn on the storage disk is concerned. Such a code can also serve to indicate a sequence number of a preceding and/or subsequent data block. This enables the addressing of the turns and/or the data blocks of the turns. A code of this kind can be particularly useful for obtaining direct access to a given turn.

A storage disk in accordance with the invention can be written and/or read by means of a device comprising an objective which is arranged to be stationary relative to the disk and by means of which a light beam originating from a light source is focussed on a turn, and also comprising a light deflection system by means of which the light beam is controlled so as to follow the turn. Disks can first be written or be derived (pressed etc.) from a master disk and be played back on an apparatus which is intended only for reading. In view of the direct accessibility of the information on such a disk, a device as described is characterized in that in synchronism with the disk rotation the light beam can be guided in the radial direction, transverse to the turns. Given guide segments are detectable in one turn. Thus, any desired turn is accessable and hence any data block in the addressed turn is activatable by counting down or further addressing of the data blocks.

A preferred embodiment of a device for writing and/or reading the storage disk in accordance with the invention is characterized in that the light deflection system consists of a slow analog-controlled light deflector and a fast digital-controlled light deflector. The guide segments are preferably scanned by the fast light deflector in order to ensure fast following of the track on the basis of the signals from the guide segments. A further aspect in accordance with the invention consists in that for the slow light deflector use is made of a piezoelectrically or electrodynamically controlled mirror whose deflection direction is measured in that the light beam jumps, under the control of the fast light deflector, onto guide segments of the previous turn, this scanning operation producing photoelectrical signals by means of which the mirror can be readjusted, if necessary a substantially constant distance from the previous turn thus being maintained. The "internal" positioning for the disk is thus realized. In a very practical embodiment, the digital light deflector serves for the scanning of the guide track by means of at least two semi-overlapping light spots and in the case of a write operation for switching the light beam in dependence of the data to be written.

A further preferred embodiment yet is characterized in that means are provided for correcting radial motions of the storage disk due to external causes, by readjustment of the slow light deflector, the signals required for this purpose being derived from the disk by the scanning of the guide segments by means of the fast light deflector. The "external" positioning of the disk. i.e. with respect to the stationary objective, is thus also ensured.

Normally, the angle through which the analog light deflector can be rotated is chosen so that a very large number of light beam directions can be covered (at least thousands). If this is not sufficient, the entire objective can be arranged to be radially displaceable with respect to the disk. See similar arrangements and the associated control systems, for example as used in the known "VLP"-systems.

As appears from the foregoing, the invention relates to a spiral-shaped data track as well as to a number of concentric tracks present on the storage disk. Because the aspects of the invention are substantially the same for both cases, the following description is based on a spiral track present/to be provided on the disk. It is of essential importance that the number of units (guide segment with data block and blank segment with data block) is odd per turn of the spiral. If concentric turns are concerned the number of units per turn must be even.

When a disk comprises a number of spiral-shaped tracks which are arranged in radial portions of the disk and which each represent channel, the device for writing and/or reading the disk is further characterized in that a plurality of channels form part of a channel group for which the light source, the intensity modulator and the fast light deflector can be used in common, the activation of the channels of a channel group being effected by a multiplex unit.

A preferred embodiment of this device is characterized in that the multiplex unit consists of a series of polarization switches and polarization sensitive beam-splitting prisms, a polarization switch and a polarization-sensitive beam-splitting prism being required for the activation of each channel of a channel group, with the exception of the last channel, a deflection prism being required for the last channel. The polarisation switches may then be electro-optical or magneto-optical switches.

The drawing shows an embodiment of the storage disk and of the arrangement for writing/reading a storage disk.

The storage disk (FIG. 1, 14) can be arranged on a rotating turntable and can consist, for example, of a thick glass substrate on which the storage material is deposited in the form of a thin layer of synthetic material or metal. It is known that for the writing of data in layers of this kind by means of a focussed light beam, a hole can be locally burned or the absorption or reflection can be locally modified. In a further embodiment, the storage layer may consist of a thin magneto-optical layer in which magnetic domains can be produced in a data pattern by heating by way of the focussed light beam and under the influence of a simultaneously applied magnetic field. In principle, however, any physical or material modification of the storage material caused by the light beam can be utilized, provided that these modifications are local and permanent.

Figure 1:
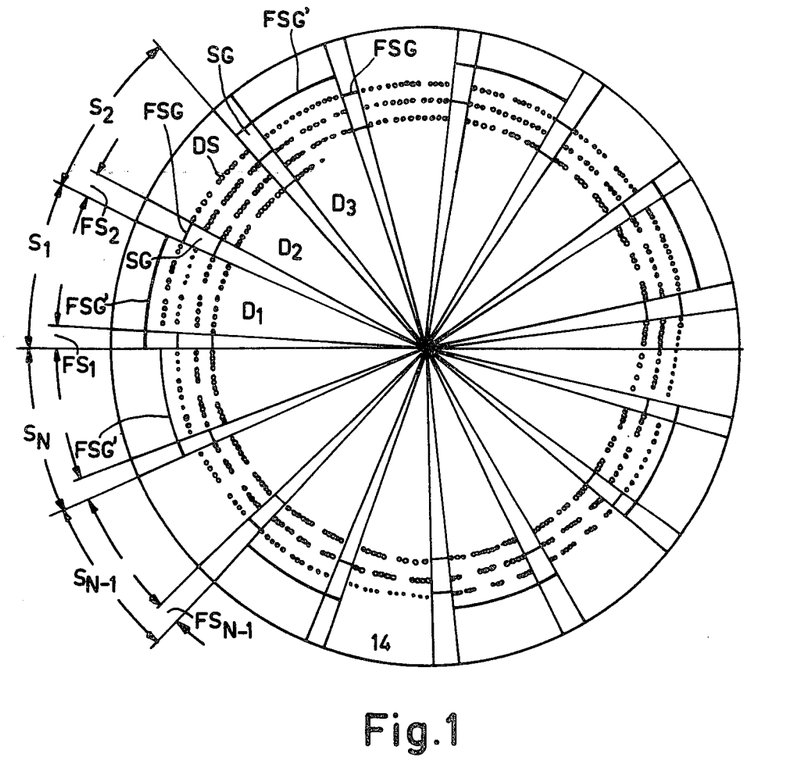
FIG. 1 shows a storage disk on which the tracks are arranged in the form of a spiral.

The preferably digital data are arranged on a spiral DS on the storage disk in data blocks $D_1$ ... Between the data blocks alternately a blank segment SG and a guide segment FSG is present along the spiral. The guide segment FSG may be a smooth track or may notably consist of digital data in a special code. The blank segment SG and the guide segment FSG have the same length in angular degrees. As a result, the following periodic arrangement on the spiral exists: ... data block $D_1$ — guide segment FSG — data block $D_2$ — blank segment SG — data block $D_3$ — guide segment FSG .... Throughout the spiral DS the bit density per angle completed should remain constant within the data blocks D. This result in a constant data flow when the rotary speed of the storage disk is constant. The length of the units (data block and guide segment or data block and blank segment) is chosen so that an odd number N of these units is accommodated on a complete turn of the spiral. The storage disk is sub-divided into sectors $S_1, S_2 ... S_N$ as shown in FIG. 1. In the sub-sectors $FS_1, FS_2 ... FS_N$ the guide segments FSG and the blank segments SG are arranged in an alternating sequence, viewed when moving on a sub-sector FS in the radial direction across the disk. The radial distance between the guide segments FSG therefore, is twice as large as the distance between the data spirals $D_S$. ... This is one of the basic aspects of the present invention. Thus, on both sides of the guide segments FSG ... sufficient space is present for lateral scanning; however, the data spirals $D_S$... can be arranged as near to each other as possible. As a result, an extremely high storage density is achieved.

The spiral preferably commences, as is shown in FIG. 1, with a turn which consists only of guide segments FSG' and which is sub-divided so that it matches the periodicity. For example, the spiral portions contained in the sectors $S_1, S_3 ... S_N$ can have the structure of the guide segments FSG, possibly slightly wider than that of the data spiral, and the spiral portions contained in the sectors $S_2, S_4 ... S_{N-1}$ may remain blank as shown in FIG. 1. In a further embodiment, only the spiral portions contained in the sub-sectors $FS_1$, $FS_3$, ... $FS_N$ have the structure of the guide segments, and the remainder of the first turn of the spiral is blank.

Figure 2:
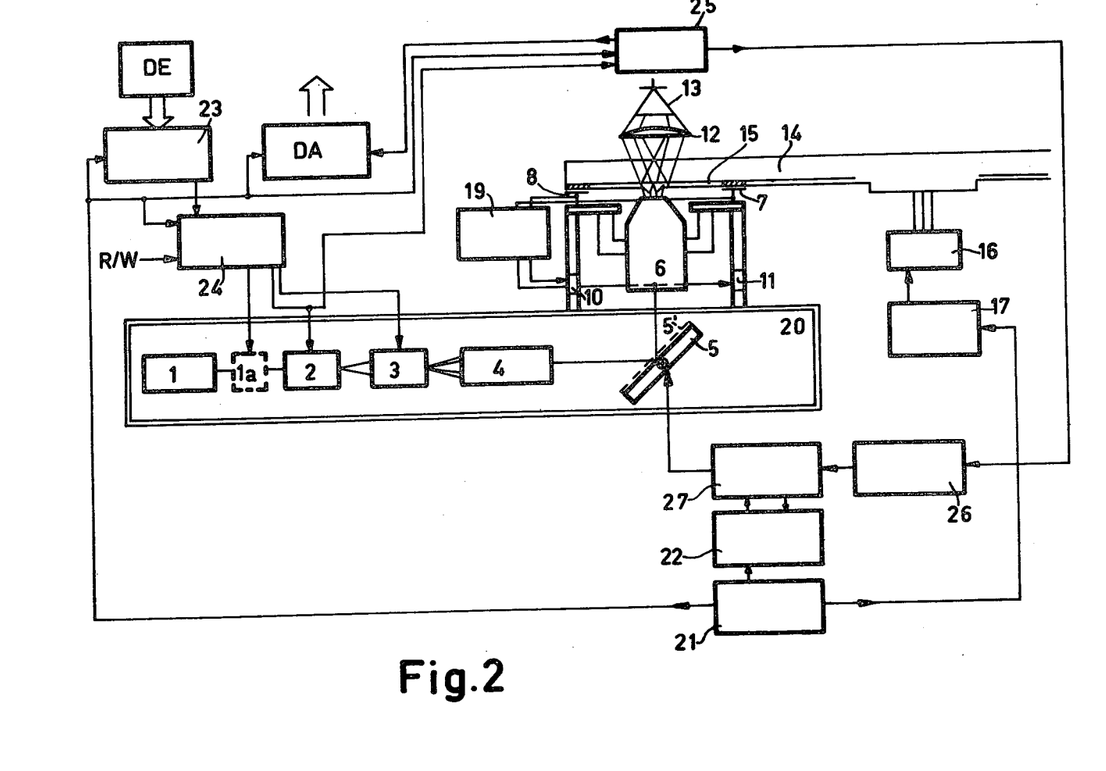
FIG. 2 shows a block diagram of a device for writing and/or reading a storage disk comprising a spiral.

FIG. 2 shows a device in accordance with the invention for writing and/or reading a storage disk in accordance with the invention. As is shown in FIG. 2, the optical system consists of a light source 1, a modulator 1a, two stages 2, 3 of a fast light deflector, a dispersion optical system 4, a light deflector 5 which is slow in comparison with the fast light deflector, an objective 6, a lens 12 and a stationary, position-insensitive photodetector 13.

The light beam can possibly be switched to two intensity levels by means of the modulator 1a. The high intensity level is possibly used for writing the data and must be adequate to modify the state of the storage material. For the reading of the data and the scanning of the guide segments, only the low intensity level is used. Normally, the state of the storage layer 15 may not be affected thereby.

In practice it may be useful to include the modulator 1a in the fast light deflector 2. The fast light deflector can be constructed in known manner as a digital electro-optical light deflector, for example as described by U. J. Schmidt in Physics Letters, Volume 12, pages 205-206 (1964) or as an acoustic-optical light deflector, for example, as described by R. W. Dixon in IEEE Transactions on Electron Devices, Volume ED-17, pages 229-235 (1969). These types of light deflector can deflect a light beam in the desired direction within microseconds. If fast light deflector is formed by a digital electro-optical light deflector, it can also take over the function of the modulator.

The slow light deflector 5 can be realized in known manner in that the light beam is deflected by a piezoelectrically or electrodynamically controlled mirror 5' which is rotatable in the plane of drawing in the embodiment shown in FIG. 2. Systems of this kind can deflect a light beam in any desired direction within milliseconds; for example, see D. Zook in Applied Optics, Volume 13, No. 4 (1974), pages 875-887. The slow light deflection per se can also be realized seperately as well as in addition to the described manner by lateral displacement of the objective 6 across the storage disk. The objective 6 transfers the light beam directions, produced by the two light deflection systems, to focal point positions on the storage layer 15 of the storage disk 14.

Reading, or possibly writing, requires only one stationary location-insensitive detector 13. This detector is arranged either behind the storage layer, in the case of transmission reading, or in front of the storage layer, in the case of reflection reading. In the case of reflection reading, the mirror 5' of the slow light deflector 5 is replaced by a beam-splitting prism. The detector 13 is preceded by a lens 12 which focusses the light reflected or transmitted by the storage layer 15 onto the detector.

In a piezo-electrically or electrodynamically controlled displacement device for the lateral displacement of the objective 6 in the radial direction, the shifting of the position is tested in that the light beam jumps onto guide segments FSG of the preceding turn of the spiral $D_S$, photoelectrical signals 13 being derived from the scanning of these segments, the said signals serving to readjust the displacement device, if necessary, and to maintain a substantially constant distance from the preceding turn of the data spiral $D_S$.

There are two beam directions which can be activated at random in rapid succession by the first stage 2 of the light deflector; these two directions correspond to two semi-overlapping focal point positions on the storage disk 14 by means of which the guide segments are scanned. The light beams can be switched by the second stage 3 of the fast light deflector to the neighboring guide segment of the preceding turn of the spiral, if they are incident on a blank segment of the sub-sector in which the corresponding guide segment is situated.

The slow light deflector 5 deflects the said light beams so that during one revolution of the storage disk 14 one turn of the spiral is written or read. Several thousand directions can be activated by means of this light deflector 5. These directed light beams are imaged into a corresponding number of focal point positions on the storage layer 15 by the objective 6. Their number equals the number of turns of the spiral.

The light source 1, the modulator 1a and the light deflection systems 2, 3 and 5 are arranged on a stationary base plate 20. However, it must be assumed that the rotating storage disk 14 moves slightly in the radial and the vertical direction with respect to this base plate.

The motions of the storage disk 14 in the radial direction are compensated for by small rotary movements of the mirror 5' of the slow light deflector 5. When the light beam is incident on given sub-sectors $FS_i$, a guide segment at the left and the right is scanned by means of the fast light deflector 2, 3 which is activated by a track organization stage 24. On the basis of a difference signal thus derived, it is established to which side of the guide segment the light beam has deflected. By means of the difference signal, obtained via a distributor 25, the slow light deflector is activated via an electronic control stage 27, after amplification in the stage 26, and the light beam is returned to the guide segment.

The small movements of the storage disk 14 in the vertical direction are compensated for by means of a capacitance measuring and control system 19. This method has been disclosed, for example, in Philips Technical Review, 33, 1973,No. 7, pages 190-193. In the case of a resolution of several thousand points and a distance between points of 2 micrometers, the objective 6 has a depth of focus of only 7 micrometers. Consequently, the distance between the objective and the storage layer 15 must be maintained with an accuracy of 1-2 micrometers. To this end, the objective 6 is arranged on two piezoelectric columns 10, 11 which are mounted on the stationary base plate. At the edge of the field of vision of the objective 6 the capacitance is measured between capacitance plates 7, 8, connected to the objective, and metallized ring electrodes which are vapor-deposited directly on the storage disk 14; signals are derived therefrom for activating the two piezo-electric columns 10, 11.

Figure 3:
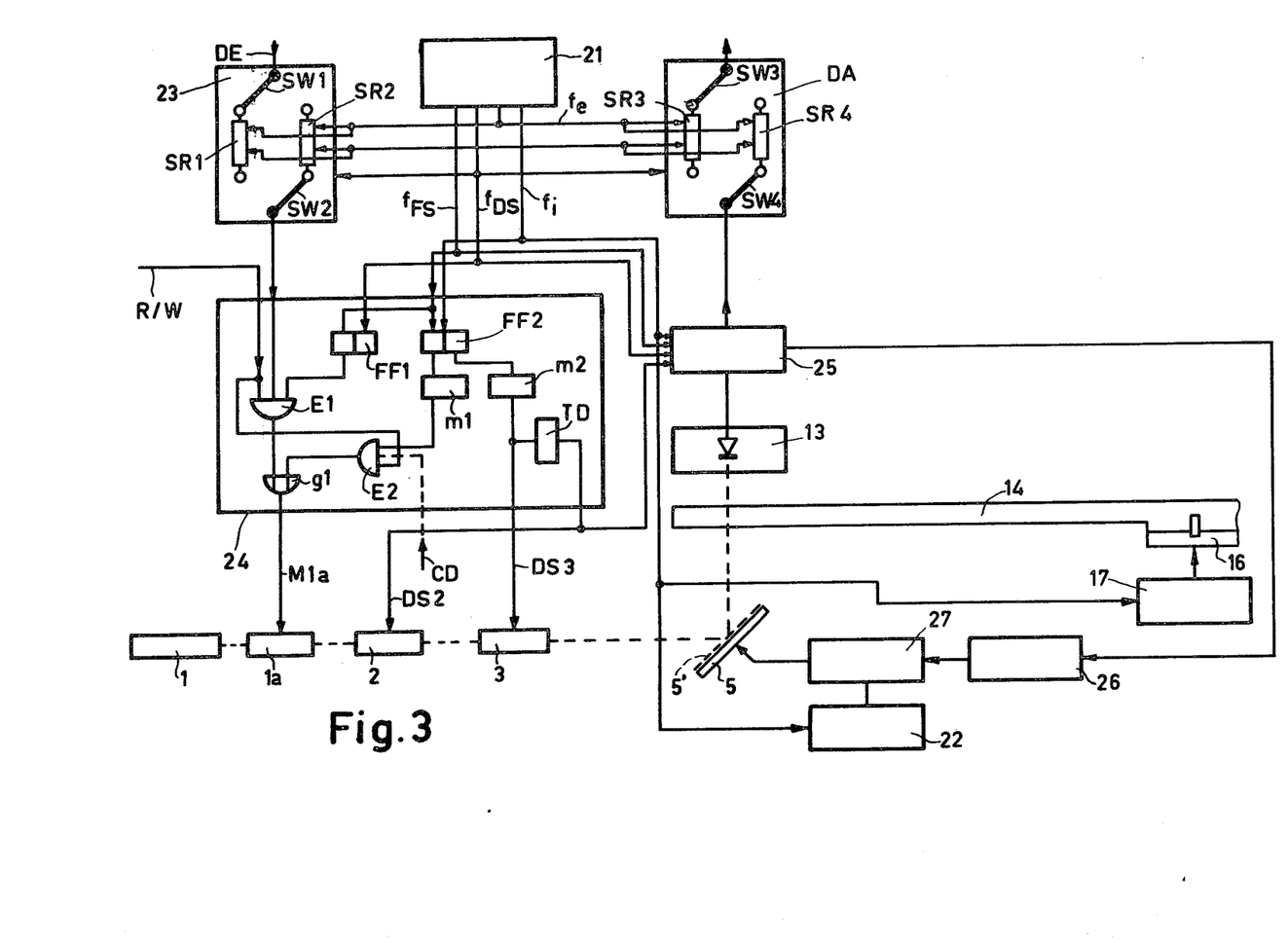
FIGS. 3 and 4 show details of the device shown in FIG. 2.

The data input 23 is controlled by the clock generator 21 for a write operation. The digital data input signal which is continuously applied from DE to 23 is compressed in order to gain time for the formation or scanning of guide segments on the storage disk. FIG. 3 shows that this is effected by means of two shift registers $SR_1$ and $SR_2$, or $SR_3$ and $SR_4$, which are alternately filled at a clock frequency $f_e$ and vacated at a clock frequency $f_i$. By means of the clock generator 21 the digital data are also combined to form data blocks, by way of clock pulses $f_{FS}$ and $f_{DS}$, and the storage disk 14 is sub-divided into an odd number of N sectors, the disk rotation drive 16 being controlled by a control stage 17.

Figure 4:
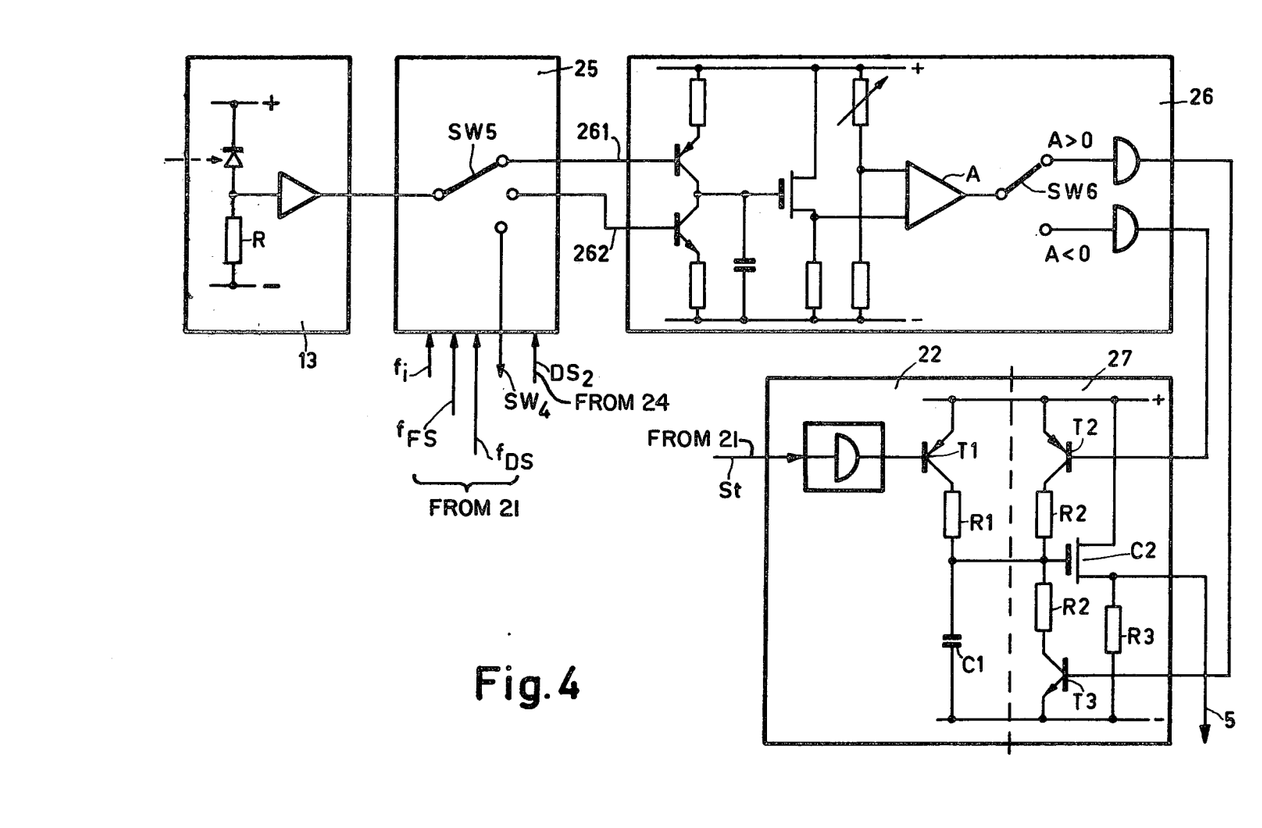

Prior to the initial writing of data, a guide track FSG' (FIG. 1) is written on the first turn of the spiral. The period during which the guide segments are provided in the sectors S or the sub-sectors FS is governed by the clock generator 21 (pulse $f_{FS}$). The first turn of the spiral is produced by the slow light deflector 5 which is activated by the sawtooth generator 22, via an electronic control stage 27, by the charging or discharging of the sawtooth voltage capacitor C which is started by a pulse St under the control of a transistor switch T1 (see FIG. 4). For the further turns of the spiral a constant distance from the first spiral is maintained in that the guide segments of the preceding turn of the spiral are intermediately scanned by the fast light deflector 2, 3, the light deflector 5 being readjusted, if necessary, on the basis thereof.

Figure 5:
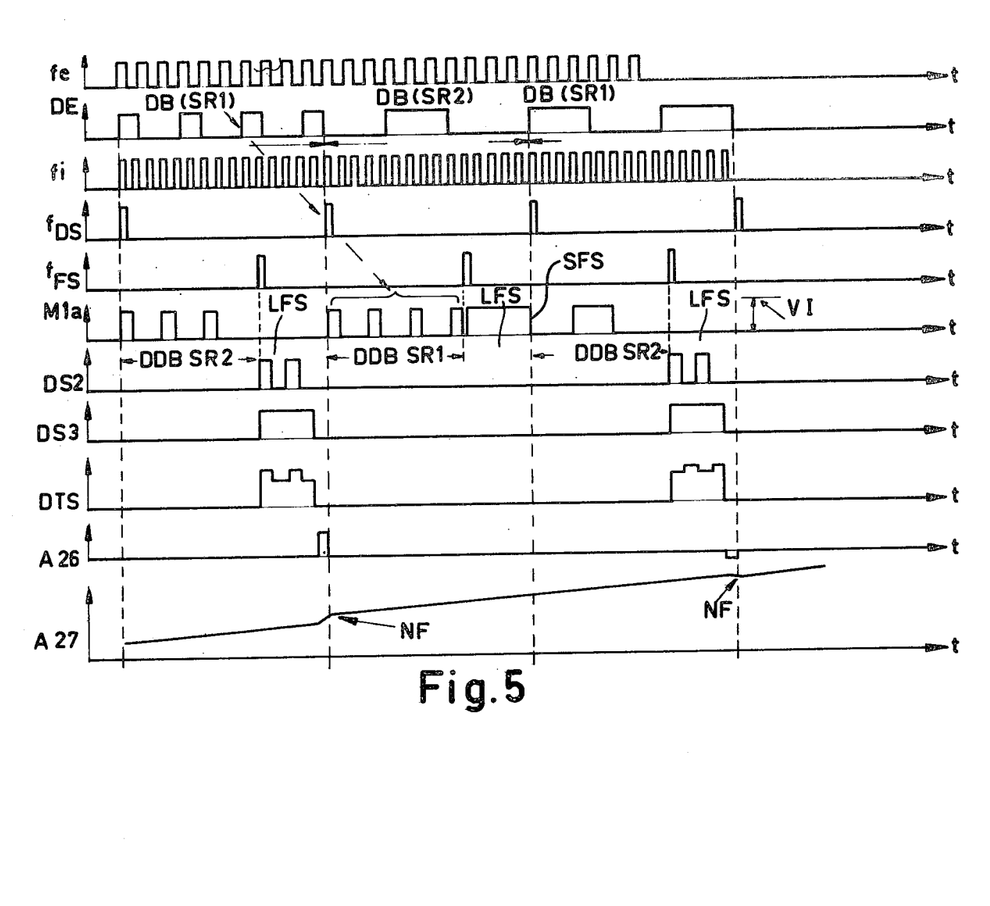
FIGS. 5 and 6 show time diagrams for writing/reading a storage disk by means of a device as shown in FIG. 2.
Figure 6:
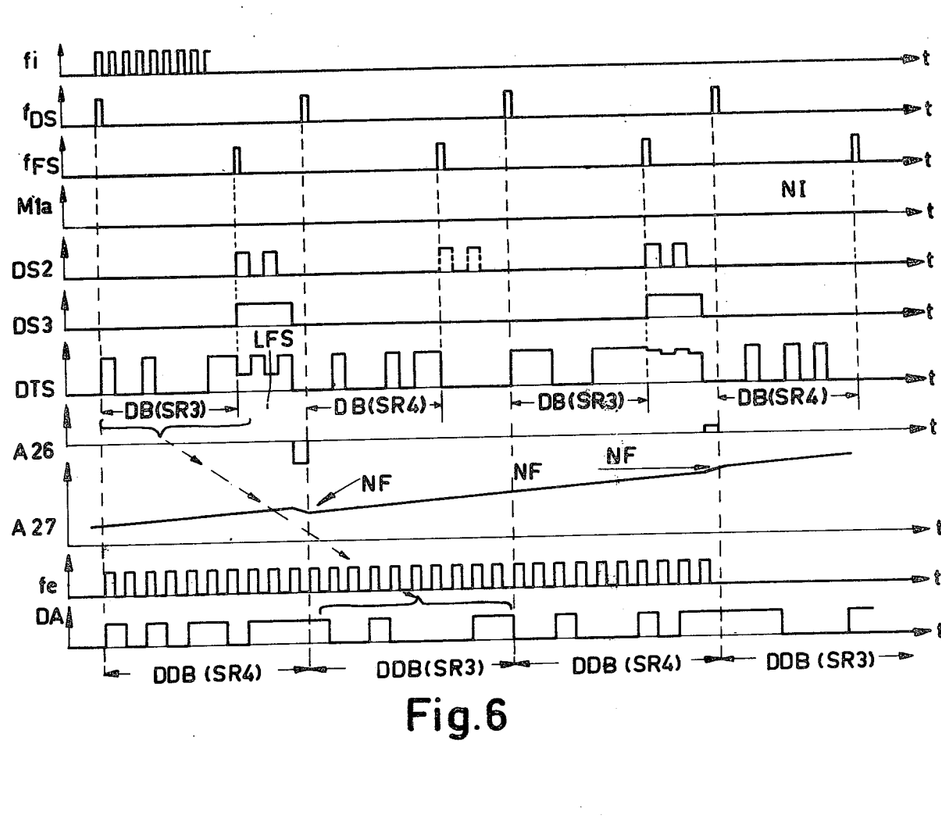

The method in accordance with the invention will be elaborated on the basis of the described FIGS. 1 to 4 in conjunction with the FIGS. 5 and 6 which show time diagrams relating to the writing and reading, respectively, of data.

The clock pulses having the frequency $f_e$ and $f_i$ are separately shown in the FIGS. 5 and 6. The reference DE denotes the data input signal which, as is shown in FIG. 3, arrives in the register SR1 in 23 via the switvhing device SW1, on the basis of the clock signal $f_e$. Simultaneously, the register SR2 is vacated by the clock signal $f_i$ via the switching device SW2. A signal M1a (FIG. 5) appears on the output of 23 and is applied to the track organization device 24 (FIG. 3). The clock pulse signals $f_{DS}$ and $f_{FS}$ are derived (for example by counting) from the signal $f_i$ in 21. The situation of these pulses in the time (FIGS. 5 and 6) is so that a track lay-out for the storage disk is obtained. $f_{DS}$ relates to the data segments, and $f_{FS}$ relates to the guide and blank segments. $f_{DS}$ sub-divides the data input signal into blocks DB which are alternately written in the registers SR1 and SR2 under the control of $f_{DS}$ (which controls the switches SW1 and SW2 in 23): DB(SR1), DB(SR2), see FIG. 5. The vacating of SR1 and SR2 is effected in a similar manner by means of $f_i$, but now via the switch SW2, and produces the blocks DDB(SR2), DDB(SR1)c see FIG. 5.

The said signal M1a (blocks DDB) is conducted by the track organization device 24, in reaction to a command given on input R/W in the case of a write operation, to the modulator 1a which is thus controlled, see FIG. 5: M1a (the pulses having the amplitude VI represent a beam intensity which is sufficient for writing).

The device 24 also receives clock pulses $f_{FS}$ and $f_{DS}$; from these pulses the signals DS2 and DS3, as shown in FIG. 5 and FIG. 6, respectively, are derived in known manner by means of logic elements as will be described hereinafter. DS2 serves for activating the first stage of the digital light deflector 2: two overlapping light spots for scanning guide segments. DS3 serves for activating the second stage of the digital light deflector 3: the jumping of the beam to a track segment which is situated on a preceding turn of the spiral.

In the case of a write operation, it is ensured in 24 that in reaction to each second pulse of the signal $f_{FS}$ a pulse having the length of a guide segment is applied to the modulator 1a. This is denoted in FIG. 5 by SFS in the diagram of M1a. This means that the guide segments FS are written in the appropriate sectors of the storage disk. The intensity of the light beam is then again NI. When nothing is written, the light beam intensity is NI.

The light signal originating from the storage disk which is detected in the detector 13 and which is converted into an electrical signal, is shaped as denoted by DTS in FIG. 5 in the case of a write procedure. This signal is applied (see FIG. 4) to the distributor 25 which includes a switching device SW5. The switching device SW5 is set to the upper or the central position by the signal DS2, the signal DTS originating from the overlapping light spots is applied to the differential amplifier 26 either via the input 261 or the inputs 262. In 26 a deviation to the left or to the right of the track is established (input signal of amplifier A, see FIG. 5, signal $a''6$):($A>0$, $A<0$) and a signal is applied to the electronic control device 27 which in this case consists of transistors T2, T3, a capacitor C2 and resistors R2 and R3. In conjunction with the sawtooth signal supplied by the sawtooth generator 22, in this case shown as a circuit comprising the transistor T1, the resistor R1 and the capacitor C1, the control signal for the analog light deflector 5 is produced on the output of 27. See the signal A27 of FIG. 5. The deflection correction for the light deflector 5 is effected at the points NF of this signal.

When the storage disk is read (possible in an apparatus enabling only reading or writing as well as reading) the following takes place:

Except when a write operation is concerned, the modulator 1a supplies, as has already been stated, a light signal from the source 1 of an intensity which is sufficient for reading: NI, see FIG. 6 at the signal M1a. The signals of FIG. 6, $f_i, f_e$, DS2, DS3, A26, A27 correspond to those of FIG. 5, because the same synchronization and tracking procedure is concerned. The difference is determined by the reading of the data itself. This is because in the case of a read operation, the detector signal DTS will be shaped as shown in FIG. 6. Besides the segments LFS, as described with reference to FIG. 5, there are also blocks DB, i.e. data blocks corresponding to the blocks written on the disk. The switching device SW5 of the distributor 25 is operated by the pulses $f_{DS}$ and $f_{FS}$ in order to ensure that the switch SW5 is in the lower position during the data segments. The blocks DB are thus applied to the switching device SW4 of DA (FIG. 3). Under the control of $f_i$ and $f_{DS}$, the registers SR3 and SR4 are alternately filled with these blocks DB; this is illustrated in FIG. 6 by the additions DB (SR3), DB(SR4). On the other hand, the registers are alternately vacated under the control of $f_e$ and $f_{DS}$ via the switching device SW3, so that output blocks as shown in FIG. 6 (signal DA) are produced: DDB(SR4), DDB(SR3) . . . .

FIG. 6 also shows that in the case of a read operation the tracking correction can also be performed on the guide segment which is situated in the turn of the spiral which is been read at this instant: see dotted DS2 in FIG. 6.

Finally, during a read operation, of course, it is also possible that in a reaction to each pulse $f_{FS}$ (instead of in reaction to each second pulse) scanning spots are directed onto the guide segments by the deflector 2 (one in a preceding turn and one in the same turn).

The track organisation device 24 can be constructed like the block 24 of FIG. 3. The AND-function gate E1 conducts, in the case of a write command on the input R/W (logic signal 1), the information applied via M1a if, moreover, the flipflop FF1 supplies under the control of $f_{DS}$, a signal which opens E1. FF1 supplies this signal for the duration of the information portion of a track between a guide segment and a blank segment, i.e. between pulses $f_{DS}$ and $f_{FS}$. Via the OR-function gate G1, the signal M1a (see diagram FIG. 5) then becomes available for writing. A pulse $f_{FS}$ are alternately conducted in the flipflop FF2 to monostable multivibrators m1 and m2, respectively. In m1 a pulse is generated which is applied, on the basis of a write command (R/W = 1), to the gate G1 via the AND-function gate E2. Consequently, on the output thereof, not only the signal M1a is present, but also a further pulse, i.e. the pulse denoted by SFS in FIG. 5. If desired, the signal SFS can be coded for addressing purposes. Coding can be externally effected via E2. This pulse SFS drives the modulator 1a to full output: a guide segment is written. m2 produces a pulse which first of all represents the signal DS3 (FIGS. 5 and 6) which provides the jumping to a guide segment in a preceding turn. Finally, the output pulses of m2 are applied to a divide-by-two device TD. This device supplies the pulses which represent the signal DS2 (again see FIGS. 5 and 6) which causes the overlapping light spot positions in the fast light deflector stage 2.

The following is a description of the above procedure on the storage disk itself (in accordance with FIG. 1). A description will be given of the complete cycle of a write operation; it is assumed that the second turn of the spiral is written and that the second stage 3 of the fast light deflector, controlled by the track organisation stage 24, just switches over the light beam from the end of the first turn of the spiral to the beginning of the first turn in the sub-sector FS$_1$. By means of the first stage 2 of the fast light deflector the guide segment in FS$_1$ is scanned and the light deflector 5 is readjusted, if necessary. By means of a signal which is derived from the clock generator 21, the light beam is switched from the guide segment, by means of the second stage 3 of the fast light deflector, back to the second turn of the spiral. From this point in the sector S$_1$ until the beginning of the sector S$_3$, the slow light deflector 5 is controlled by the sawtooth generator 22 and is tested and readjusted, if necessary, only by the jumping to the guide segment of the first turn in the sub-sector FS$_3$.

The light modulator 1a is then activated via the data input 23 and a data block is written in the sector S$_1$. When the sector S$_2$ is entered, a new guide segment is written in the sub-sector FS$_2$ of the second turn of the spiral, and subsequently a data block is written in the sector S$_2$. After that, the light beam is quickly deflected, by the second stage 3 of the fast light deflector, to the guide segment in the sub-sector FS3 of the first turn of the spiral, and the described cycle is repeated.

In the case of a read operation, first the first turn of the spiral, containing only guide segements FSG', is located. Subsequently, the complete spiral can be scanned, in which case the slow light deflector 5 merely has to pass freely through one sector because, contrary to a write operation, either the guide segment in the turn just scanned or, if a blank segment is detected in the turn, the guide segment of the preceding turn can be used for the readjustment of the slow detector 5.

Figure 7:
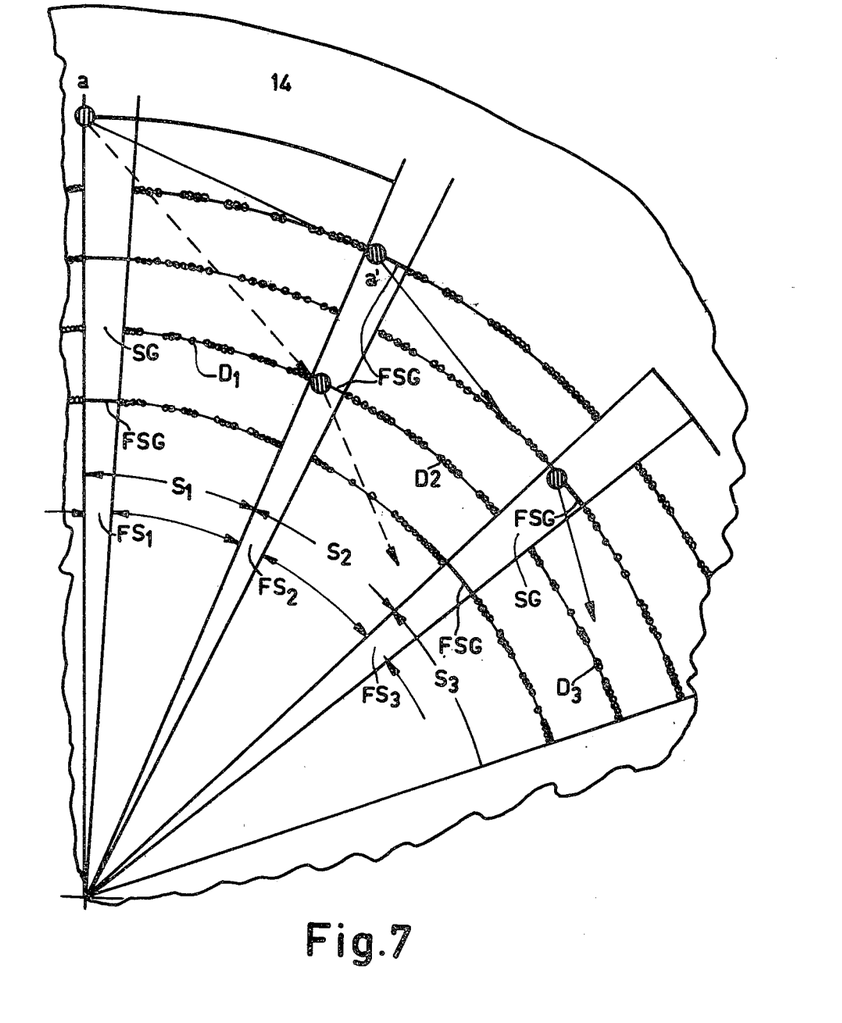
FIG. 7 shows a detail of the track arrangement on a storage disk with random access to a track or a data block.

The method, however, also enables random access, for example, to a track of the spiral, or to any data block. FIG. 7 shows the relevant procedure. The slow light deflector 5 performs a continuous deflection motion which is adapted in the time to the rotation of the disk, and locates as from the beginning of the giode track (a) in the sector S$_1$ either the guide segment (a') of the sector S$_2$ on the next turn of the spiral or generally a guide segment in the sector $S_{1+k_1}$ on the $k_2^{nd}$ turn of the spiral. When this guide segment is reached, the light deflector 5 is briefly held at this position by the scanning of this guide segment. After that, adapted in the time to the rotation of the disk, the continuous deflection motion to the next selected guide segment which is situated further inwards on the spiral is started again. Thus, a desired turn of the spiral can be reached by means of the light deflector 5, and the desired data block D situated in this turn can be located.

The random access time amounts at the most to the time required for two rotations of the disk when, during the radial traversing of the spiral, the guide segment of the next sector in the next turn of the spiral is located and the overall number of turns of the spiral is smaller than or equal to the number of sectors.

Figure 8A:
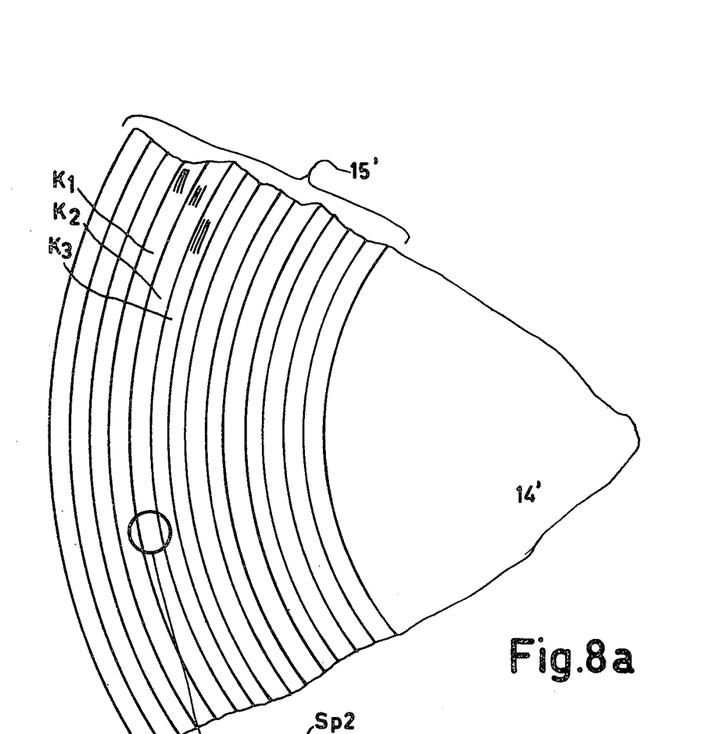
FIGS. 8a and 8b show a further lay-out of the storage disk comprising a plurality of spiral tracks.
Figure 8B:
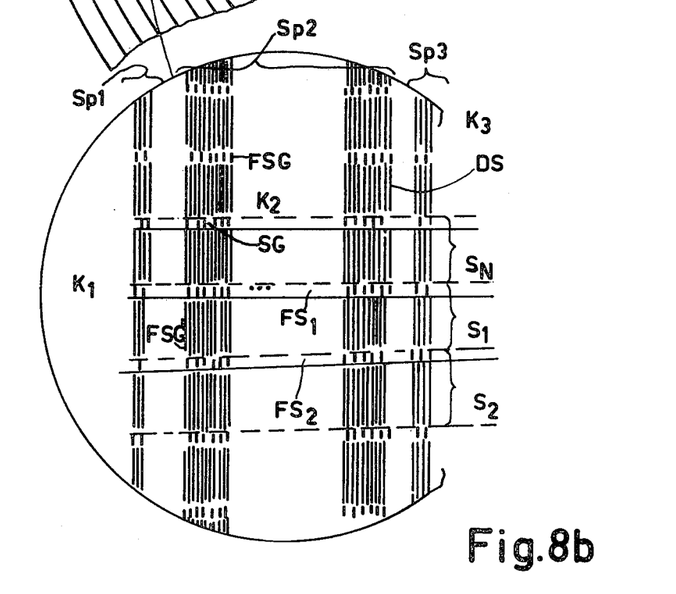

As is shown in FIG. 8a, and in detail again in FIG. 8b, the storage surface of the storage disk 14' is sub-divided into radial regions $K_1$, $K_2$ . . . In each radial region the data are recorded in a spiral Sp1, Sp2. Each spiral is divided into sectors $S_1$, $S_2$, . . . and is further composed as shown in FIG. 1.

For each radial storage region use is made of the objective 6, by means of which the light beam is focussed on the storage surface 15', and the slow deflection system 5, 5' by means of which the focus can be shifted in the radial direction (see Fig. 2). The objective 6, the associated deflection system 5, 5' and the associated radial storage region are referred to as the channel $K_1$, $K_2$, . . . . A plurality of channels $K_1$, $K_2$, . . . are combined to form a channel group.

Figure 9:
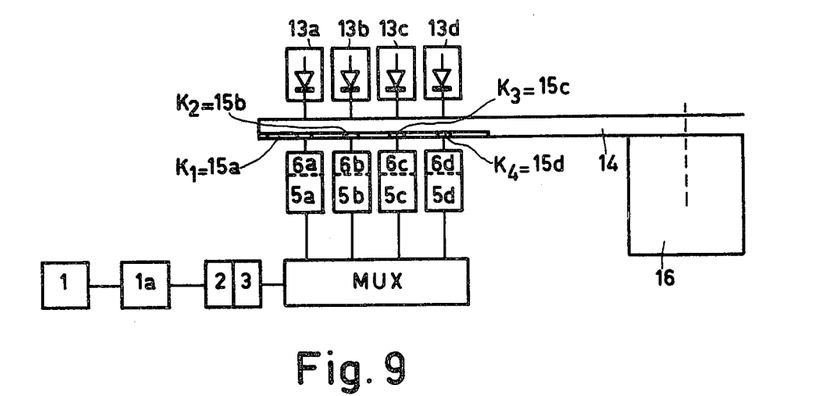
FIG. 9 shows a diagram of the optical construction for a channel group of an optical multichannel disk storage system.

FIG. 9 diagrammatically shows the optical construction for a channel group of an optical multi-channel disk storage system. The channels of the disk are operated by channel devices. All channel devices of a channel group have in common a light source 1, an intensity modulator 1a and the fast light deflector 2, 3 which are required for the storage and retrieval of digital data. The channels K1, K2, K3, K4 of a channel group are activated by means of and optical multiplex unit MUX. The channel device for the channel K1, for example, consists of the objective 6a and the slow light deflector 5a, referring to the radial region 15a of the storage surface 15 and the photodetector 13a, all this.

Figure 10:
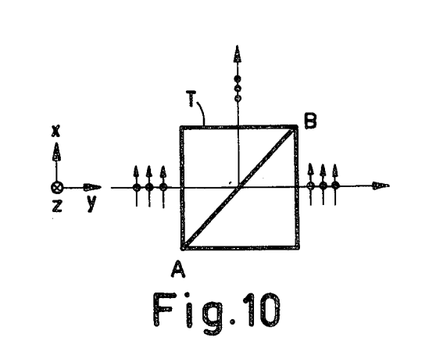
FIG. 10 shows a polarisation-dependent beam-splitting cube.

The optical multiplex unit MUX consists of a series of electrically or magnetically controllable polarisation switches P and polarisation-dependent beam-splitting cubes T. The operation of a polarisation-dependent beam-splitting cube T is illustrated in FIG. 10. A light beam which is incident in the y-direction and which is polarised parallel to the x-direction is transmitted in the y-direction by the beam-splitting cube T. A light beam which is incident in the y-direction but which is polarised perpendicularly to the x-direction and the y-direction, is reflected by the surface AB. The intensity ratio between the two transmitted beams can be adjusted by the polarisation of the incident beam. Polarisation switches are known per se from "Applied Optics" October 1966, Volume 5, No. 10, pages 1657–1667.

Figure 11:
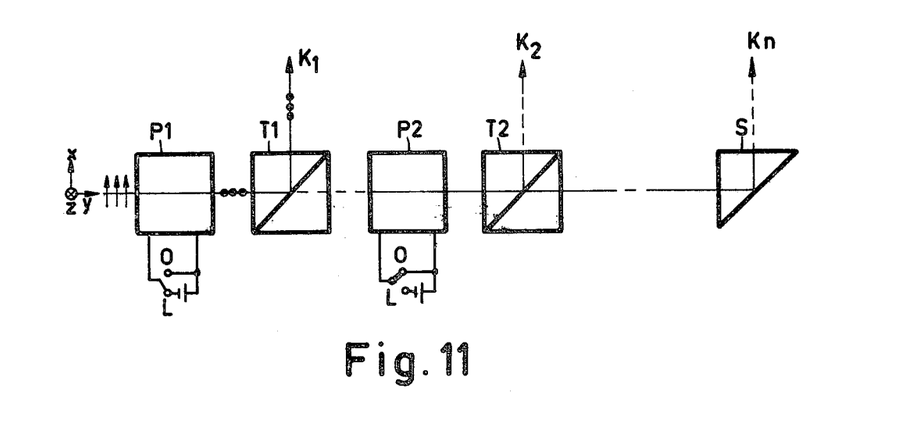
FIG. 11 diagrammatically shows an optical multiplex unit.

FIG. 11 shows an embodiment of the optical multiplex unit. For the description of the operating principle it is assumed that the light incident in the x-direction is linearly polarised and that the polarisation switches are adjusted so that they do not modify the polarisation direction of the incident light in the switch position O (voltage O), and that they switch the polarisation direction to the z-direction in the switch position L (voltage L). When the polarisation switch P$_1$ is in the position L, the polarisation direction of the incident light is switched to the z-direction. The incident light is deflected to the channel $K_1$ by the polarisation-sensitive beam-splitting cube $T_1$. When the polarisation switch $P_1$ is in the position O and the polarisation switch $P_2$ is in the position L, the incident light is transmitted by $T_1$ and is deflected to the channel $K_2$ by $T_2$, etc.

The activation of the last channel $K_n$ of the channel group requires only a deflection prism S which deflects the light beam transmitted by the preceding polarisation-sensitive beam-splitting cube $T_{n-1}$ to the channel $K_n$. If the incident light is polarised in the z-direction, merely the position of the polarisation switch $P_1$ must be changed from L to O or from O to L. As a result of the activation of the polarisation switches $P_1 \ldots P_{n-1}$ by means of the voltage O or L, a given channel $K_i$ is addressed and exposed to the total light intensity of the incident light beam.

This connection method enables time multiplex addressing of the channels $K_1 \ldots K_n$. However, if suitable intermediate voltages U ($O<U<L$) are applied to the polarisation switches $P_1 \ldots P_{n-1}$, all channels $K_1 \ldots K_n$ are addressed in parallel. If the voltages are suitably chosen, the light intensity per channel amounts to the $n^{th}$ part of the incident light intensity.

Figure 12:
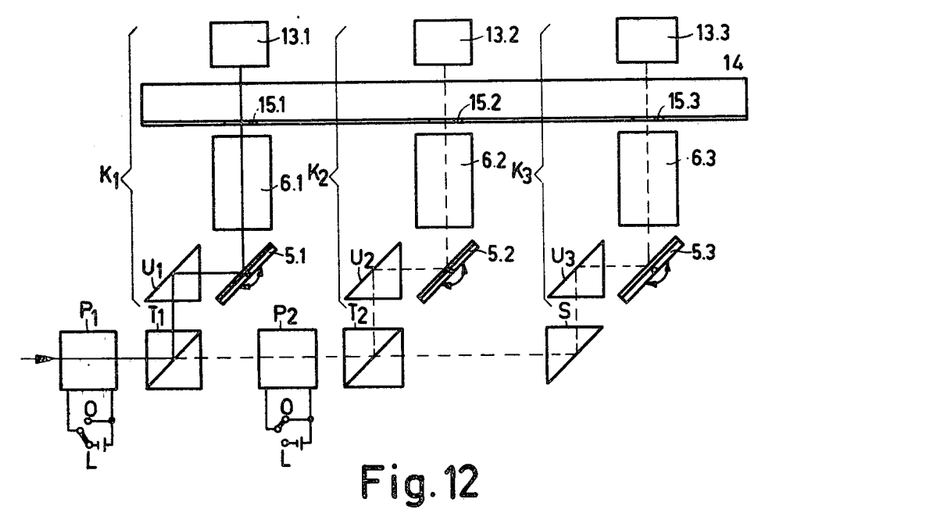
FIG. 12 shows an arrangement for a channel group, consisting of stationary objectives, mirror deflectors and a multiplex unit.

FIG. 12 shows an embodiment for a channel group comprising three channels $K_1$, $K_2$, $K_3$. The objectives 6.1 . . . 6.3 are stationary. The radial movement of the focus in the storage surface regions 15.1 . . . 15.3 is produced by means of the mirror deflectors 5.1 . . . 5.3. The light beams from the multiplex unit are directed onto the mirror deflectors by the deflection prisms $U_1 \ldots U_3$.

Figure 13:
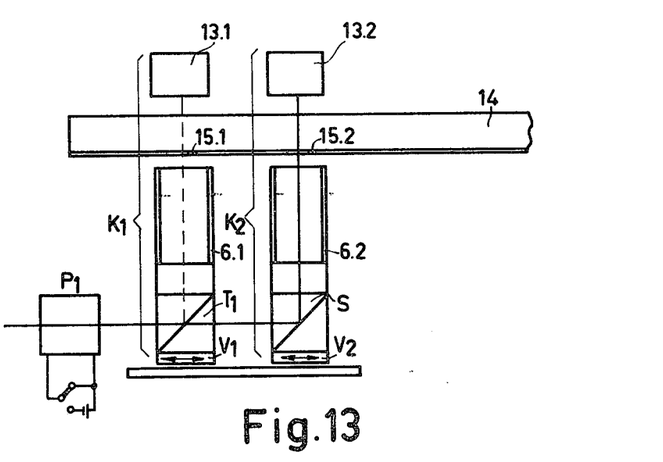
FIG. 13 shows an arrangement of the radially displaceable objective and multiplex unit.

FIG. 13 shows a further embodiment for a channel group consisting of two channels $K_1$, $K_2$. The objective 6.1 and the polarisation-sensitive beam-splitting cube $T_1$ are mounted on a sliding table $V_1$, whilst the objective 6.2 and the deflection prism S are mounted on a sliding table $V_2$. The photodetectors 13.1, 13.2 are stationary. The radial motion of the focus in the storage surface regions 15.1 and 15.2 is realised by the shifting of the sliding tables $V_1$ and $V_2$ which can be electrically controlled, for example, by a loudspeaker system as is usual for magnetic disk stores.

In both embodiments the arrangement of channels to form a channel group is so that adequate space exists in the radial direction for the mechanical construction of the optical components of the channels. The region between the annular storage surfaces of a channel group, for example, between 15a, 15b, 15c and 15d in FIG. 9 can be utilised by a further independent channel group.

The channels of a channel group are preferably operated according to the time multiplex method for stroing the data. In that case the full intensity of the light source is available for each channel. In the case of storage materials where the absorbed light energy is utilized in a heating process for the storage, the efficiency is higher in the case of high-intensity exposure and small exposure time than in the case of low-intensity exposure and a long exposure time. The channels of a channel group are preferably operated in parallel for the reading of the data stored.

What is claimed is:

1. A storage disk for storing data in spiral or concentric tracks, comprising a disk-shaped storage medium having a recording surface divided into a plurality of equiangular guide sectors; each two of said data storage sectors being separated by a guide sector; said tracks thereby passing successively through data storage sectors and guide sectors; a data block of information being stored in substantially all of the track portions in each of said data storage sectors; guide segments being stored along the track in the guide sectors only adjacent alternate data blocks; the number of data storage sectors being odd to maintain the radial distance between edges of the guide segments substantially euqal to twice the radial distance between data blocks; blank segments being provided along the tracks in the guide sectors and adjacent further alternate data blocks, the tracks thereby containing repetitive successions of a data block, a guide segment, an additional data block and a blank segment.

2. A storage disk as claimed in claim 1, wherein a first turn consists only of guide segments.

3. A storage disk as claimed in claim 1 wherein the width of the guide segments is larger than that of the data block.

4. A storage disk as claimed in claim 1, wherein guide segments are provided with a code which contains the number of a turn.

5. A storage disk as claimed in claim 1, wherein the guide segments are provided with a code which indicates whether the number of a turn of the spiral or concentric turn is even or odd.

6. A storage disk as claimed in claim 1, wherein the guide segments are provided with a code which contains a sequence number of an adjacent data block.

7. A storage disk as claimed in claim 1, provided with a thin storage layer of synthetic material or metal in which holes can be burned corresponding to the data.

8. A storage disk as claimed in claim 1, provided with a magneto-optical storage layer.

9. A storage disk as claimed in claim 1, in which the data track is a spiral, wherein the number of units, i.e. the number of data storage sectors is odd per turn of the spiral.

10. A device as claimed in claim 1, further comprising a stationary optical detector which receives light from the stroage disk for reading the data.

11. A device for reading and/or writing on a rotating storage disk wherein data is stored in spiral or concentric tracks on a disk-shaped storage medium having a recording surface divided into a plurality of equiangular data storage sectors and an equal number of equiangular guide sectors; each two of the data storage sectors being separated by a guide sector; the tracks thereby passing successively through data storage sectors and guide sectors; a data block of information stored in substantially all of the track portions in each of the data storage sectors; guide segments being stored along the tracks in the guide sectors only adjacent alternate data blocks; a number of data storage sectors being odd to maintain the radial distance between edges of the guide segments substantially equal to twice the radial distance between data blocks; blank segments being provided along the tracks in the guide sectors and adjacent further alternate data blocks, the tracks thereby containing repetitive successions of a data block, a guide segment, an additional data block and a blank segment; the writing and/or reading device comprising an objective mounted in a fixed radial position with respect to the storage disk; a light source means for providing a light beam; means for focussing the light beam through the objective onto said tracks, and a light deflection system means for periodically radially deflecting said light beam from a data block track to a guide segment of a preceeding track and for deflecting said light beam from said guide segment back to said data block track and for controlling the light beam to follow said data block track in response to positional differences between said light beam and said guide segment of said preceeding track.

12. A device as claimed in claim 1, wherein a synchronism with the disk rotation the light beam is be guided in the radial direction, transverse to the turns, given guide segments being detectable in one turn, thus any desired turn being accessible and hence each data block in the addressed turn being activatable by counting down or further addressing of the data blocks.

13. A device as claimed in claim 11, wherein the disk comprises a number of spiral-shaped tracks which are situated in radial regions of the disk and which represent a corresponding number of channels, a plurality of channels forming part of a channel group for which the light source, the intensity modulator and the fast light deflector are used in common, the activation of the channels of a channel group being effected by a multiplex unit.

14. A device as claimed in claim 13, wherein the multiplex unit consists of a series of polarization switches and polarization-sensitive beam-splitting prisms a polarization switch and a polarization-sensitive beam splitting cube being required for the activation of each channel of a channel group, with the exception of the last channel, a deflection prism being required for the last channel.

15. A device as claimed in claim 14, wherein the polarization switches of the multiplex unit are electro-optical polarization switches.

16. A device as claimed in claim 14, wherein the polarization switches of the multiplex unit are magneto-optical polarization switches.

17. A device as claimed in claim 11, wherein the light deflection system consists of a slow analog-controlled light deflector and a fast digital-controlled light deflector.

18. A device as claimed in claim 17, wherein for the slow light deflector use is made of a piezoelectrically or electrodynamically controlled mirror whose deflection direction is measured in that the light beam jumps, under the control of the fast light deflector, onto guide segments of the preceding turn, this scanning operation producing photoelectrical signals by means of which the mirror can be readjusted, if necessary, thus a substantially constant distance from the preceding turn being maintained.

19. A device as claimed in claim 17, wherein the digital light deflector scans the guide track by means of at least two semi-overlapping light spots and, in the case of a write operation, switches the light beam in dependence of the data to be written.

20. A device as claimed in claim 17, wherein the fast light deflector scans the guide segments.

21. A device as claimed in claim 20, further comprising means for correcting radial motions of the storage disk due to external causes, by readjustment of the slow light deflector, the signals required for this purpose being derived from the disk by the scanning of the guide segments by means of the fast light deflector.

* * * * *

UNITED STATES PATENT AND TRADEMARK OFFICE
CERTIFICATE OF CORRECTION

PATENT NO. : 4,094,013
DATED : June 6, 1978
INVENTOR(S) : Bernhard HILL, Rudiger PEPPERL and Johann KRÜGER It is certified that error appears in the above—identified patent and that said Letters Patent is hereby corrected as shown below:

Claim 12, line 1, change "a" to --in--

Signed and Sealed this

First Day of February 1983

[SEAL]

Attest:

GERALD J. MOSSINGHOFF

Attesting Officer     Commissioner of Patents and Trademarks